April 9, 1935.  G. FLEISCHEL  1,996,915
APPARATUS FOR PROGRESSIVELY CHANGING SPEED RATIOS
Filed Sept. 19, 1932  5 Sheets-Sheet 2
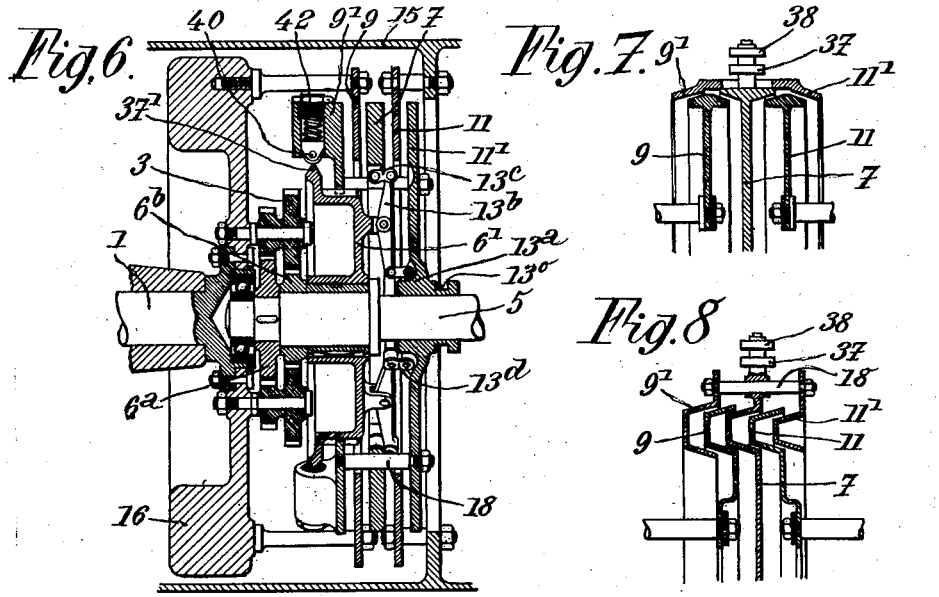
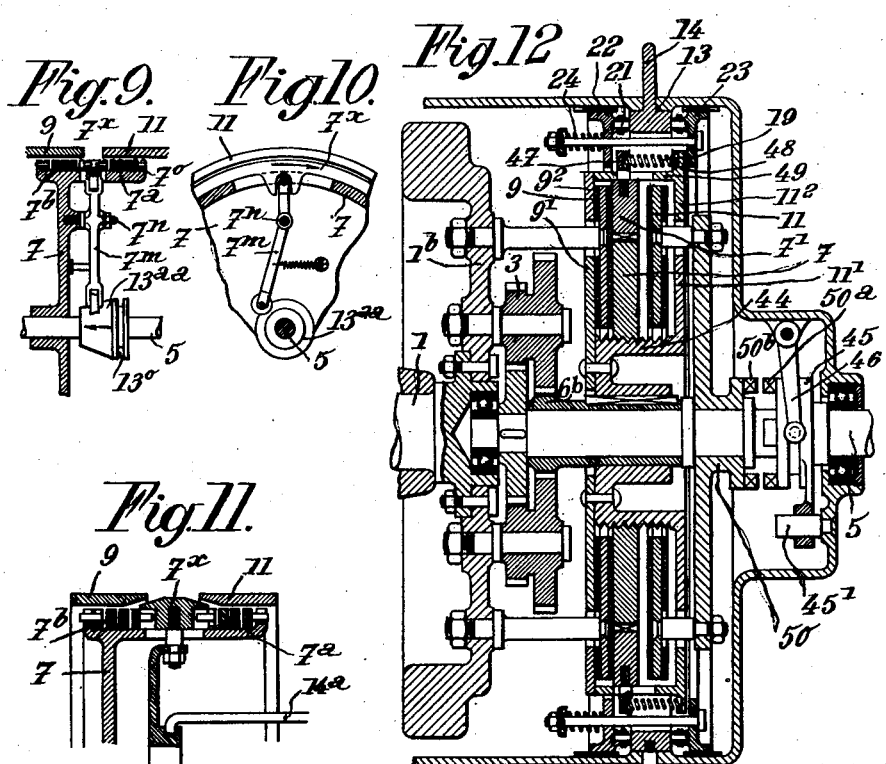
Gaston Fleischel
Inventor.
by Louis Barnett
Attorney.

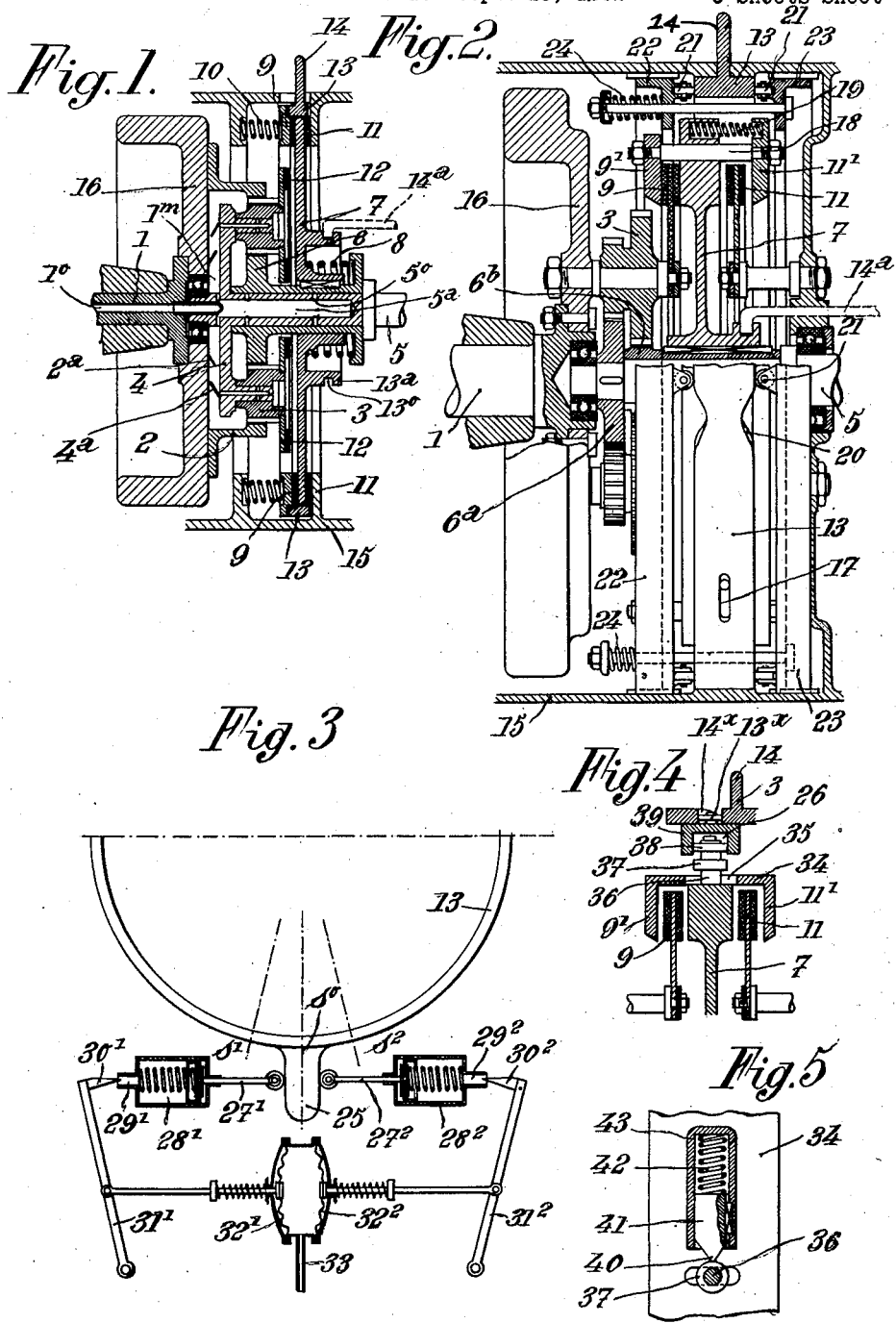

April 9, 1935.　　　　G. FLEISCHEL　　　　1,996,915
APPARATUS FOR PROGRESSIVELY CHANGING SPEED RATIOS
Filed Sept. 19, 1932　　　5 Sheets-Sheet 3
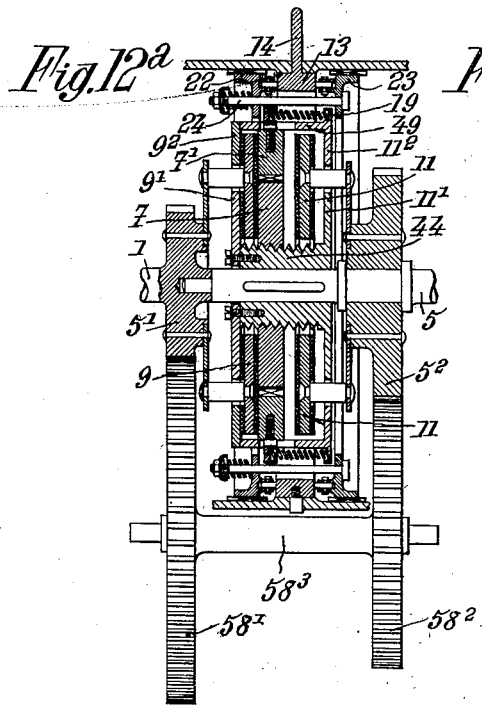
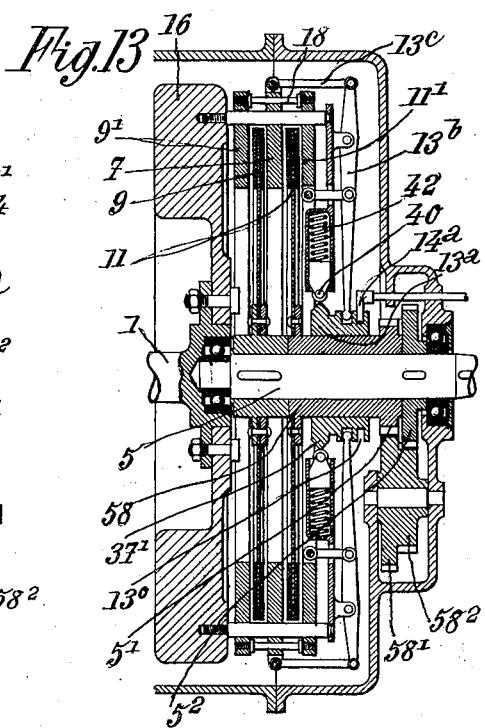
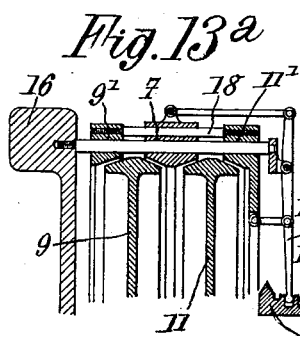
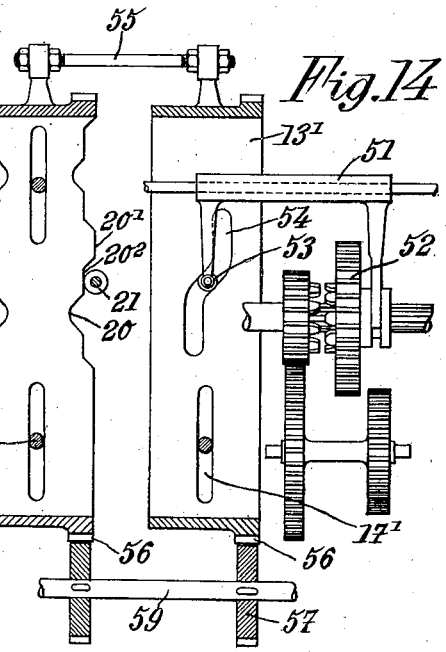
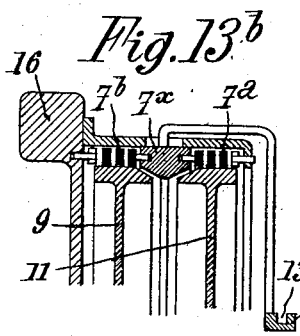
Gaston Fleischel
Inventor
by Louis Barnett
Attorney April 9, 1935.  G. FLEISCHEL  1,996,915
APPARATUS FOR PROGRESSIVELY CHANGING SPEED RATIOS
Filed Sept. 19, 1932   5 Sheets-Sheet 4
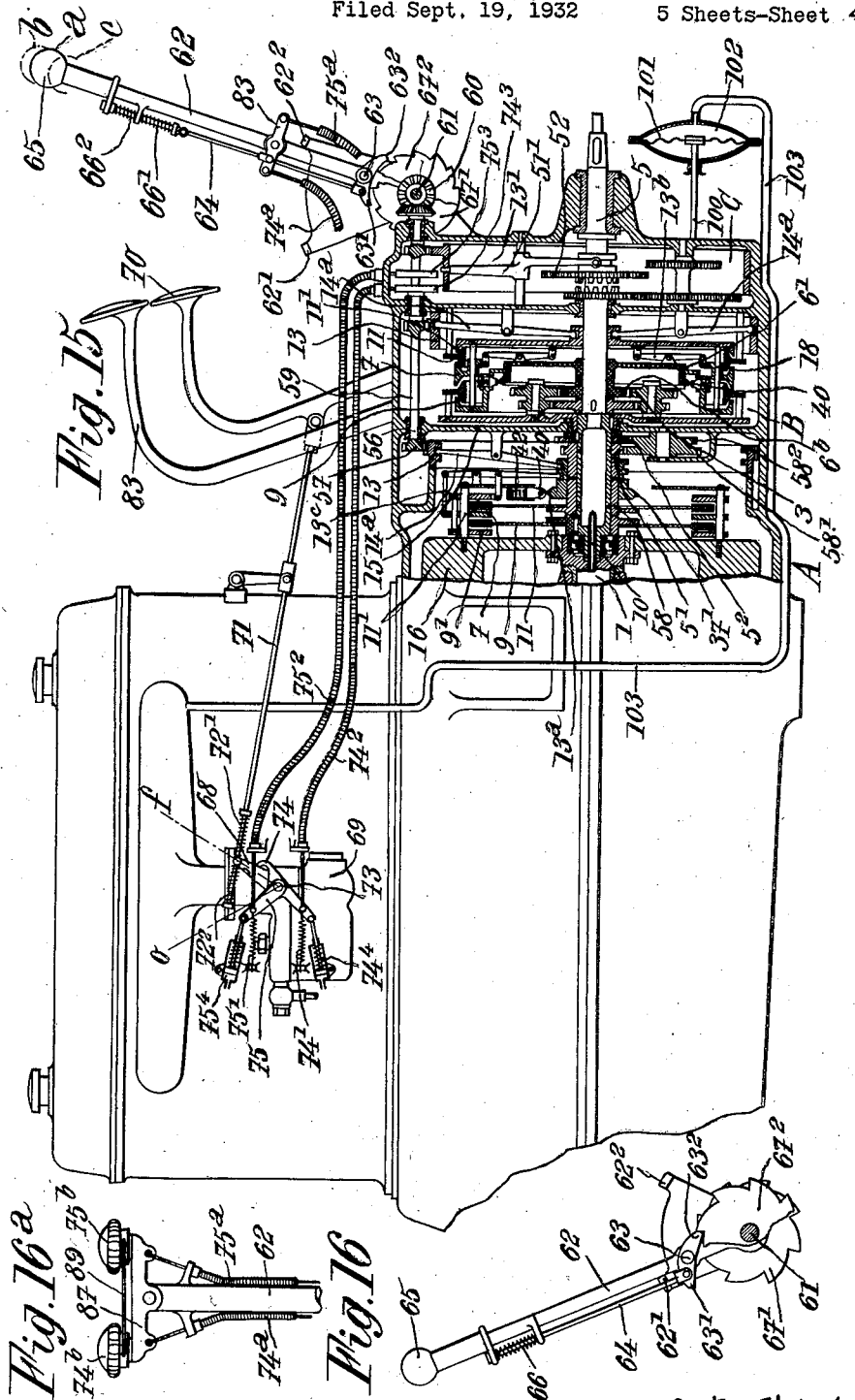
Gaston Fleischel
Inventor
by Louis Barnett
Attorney.

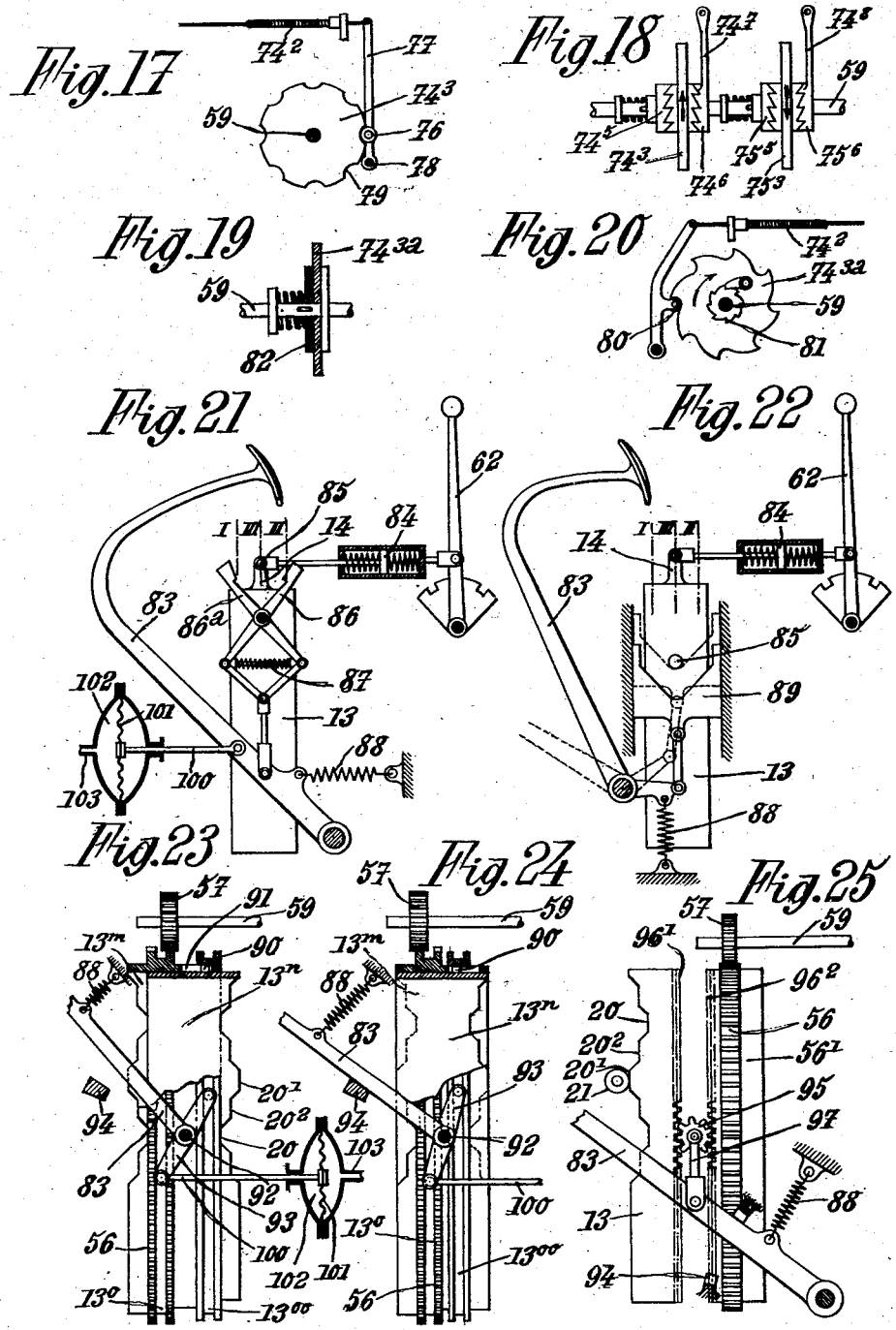

Patented Apr. 9, 1935

1,996,915

UNITED STATES PATENT OFFICE 1,996,915

APPARATUS FOR PROGRESSIVELY CHANGING SPEED RATIOS

Gaston Fleischel, Bleneau, France, assignor to "Société pour l'application des transmissions automatiques Fleischel," Paris, France, a corporation of France Application September 19, 1932, Serial No. 633,784
In Belgium October 8, 1931

7 Claims. (Cl. 74—260)

The present invention relates to apparatus for progressively changing speed ratios and, more particularly, to those of the type used on automobiles.

Transmissions in which changes of speed ratio are effected "progressively" are characterized by the fact that they may be operated irrespective of the conditions under which the various internal operating elements of the transmission function. Transmissions of this kind, if properly designed, may be operated without any precaution and without any such accessory manoeuvres as displacement of a main clutch or of the accelerator pedal. As an example of transmissions of this kind, those utilizing planetary or epicycloidal systems may be mentioned.

As contrasted with "progressive" transmissions of the foregoing type, the ordinary gear box utilizing snatch gears may be cited as being of the "non-progressive" type. In this latter species of gear box, the displacement of a lever forcibly couples a pair of operating elements which may be turning at very different speeds. The proper manoeuvring of a non-progressive transmission requires considerable ability in the coordination of other movements such as gradual release of the main clutch and changes in the position of the accelerator pedal. Transmissions are known which are not as rapid in their action as those employing snatch gears but which require, nevertheless, certain precautions or accessory manoeuvres to be properly operated. Transmissions of this latter type will, hereinafter, nevertheless be grouped with those of the snatch gear type as being "non-progressive".

In transmissions of the progressive type employing for example, planetary systems the coupling elements employed for obtaining progressive action are generally designed to have a relatively large diameter. This somewhat complicates the problem of design since the pinions employed are of small diameter and it is desireable to decrease to a minimum the distance between their corresponding shafts. In addition, the control for progressively operated transmissions is more complex than that for non-progressive gear boxes utilizing snatch gears, it being necessary to provide a separate coupling element for each speed combination desired.

One of the objects of the present invention is to provide a progressive type of transmission in which the function of several operating elements is combined so as to appreciably decrease the number thereof.

Another object is to provide an assembly in which a single control lever may be utilized to obtain any one of a large number of speed combinations without auxiliary manoeuvres of a main clutch or of the accelerator pedal.

Still another object is to provide means for changing the carburettor adjustment during certain changes of speed combinations whereby the motor is automatically accelerated or retarded in accordance with the nature of the speed change being effected.

Another object is to provide means having a retarding effect on the elements controlling a progressive transmission, said retarding effect being a function of the momentary power being developed by the motor.

An additional object is to provide an improved lubricating system for progressive types of transmission.

A further object is to provide a combination of progressive and non-progressive transmissions wherein even those of the "non-progressive" type are controlled by transmissions operating progressively.

A further object is to provide a special control for electromagnetically operated transmissions.

A still further object is to provide means operative by variations in the suction inside the intake manifold of the motor for varying the frictional force exerted on a pair of coupling elements.

Other objects will appear in the course of the detailed description now to be given with reference to the accompanying drawings, in which:

Figure 1 is an axial section through on illustrative embodiment of the invention;

Figure 2 is an elevation, partially in section of a second form of the invention;

Figure 3 is a diagrammatic detail showing a variant of part of the structure represented in Figure 2;

Figure 4 illustrates, in section, another variant of part of the assembly shown in Figure 2;

Figure 5 is an elevation, partially in section, of the device shown in Figure 4;

Figure 6 represents an axial section of a third possible form of the invention;

Figure 7 and 8 are axial sections showing two modifications of certain parts of the transmissions represented in Figures 2 and 6;

Figure 9 is an axial section through a fourth form of transmission;

Figure 10 illustrates the structure shown in Figure 9 as seen in transverse section;

Figure 11 represents, in axial section, a modification of the apparatus shown in Figures 9 and 10;

Figure 12 is an axial section through a fifth form of the invention;

Figure 12ª is a section through a sixth form of the invention;

Figure 13 represents, in section, a seventh embodiment of the invention;

Figures 13ª and 13ᵇ are sections through two modifications of the assembly shown in Figure 13;

Figure 14 illustrates, in elevation, a combined control for two transmissions of different types;

Figure 15 is an elevation, partially in section, of a compound transmission together with its various controls;

Figure 16 is a detail, in elevation, of part of the control assembly represented in Figure 15;

Figure 16ª shows, in elevation, a control of the type represented in Figure 16 modified for the special case of a electro-magnetically operated transmission;

Figure 17 is an elevation of a cam control forming part of the assembly shown in Figure 15;

Figure 18 is a side view of one possible mounting for cams of the type shown in Figure 17;

Figure 19 represents an elevation, partially in section, of another mounting for the cams shown in Figure 17;

Figure 20 shows an elevation of another cam capable of replacing the one shown in Figure 17 together with means for insuring unidirectional rotation;

Figures 21 to 25 are side views, partially in section, of four different assemblies permitting uncoupling of certain of the transmissions independently of their normal operation.

Referring to Figure 1 of the drawings, there is shown a planetary type of transmisison including a driving shaft 1, a fly wheel 16 mounted to rotate with said driving shaft, an internally toothed ring 2 rigidly attached to the fly wheel, a plurality of satellite gears 3 meshing with the teeth of ring 2, a plate 4 supporting the satellite gears, a driven shaft 5 rigidly connected to, or integral with, plate 4, a central planetary gear 6 meshing with satellites 3 and mounted to freely rotate on driven shaft 5, a coupling disc 7 mounted to rotate with gear 6 and slidable longitudinally thereon, a plurality of clutch plates or discs 12 mounted to rotate with satellites 3, a plate 9 mounted to move toward and away from plate 7 and prevented from rotating in any way desired, a pair of opposed springs 8 and 10 reacting on elements 7 and 9 respectively, a flange or braking plate 11 integral with the transmission casing 15, and a ring 13 provided with a handle 14 and capable of being operated to displace element 9 toward and away from plate 7.

In the position shown in Figure 1, the various operating elements occupy the position corresponding to the smaller of two possible speed combinations. It will be noted that springs 10 act on ring 9 so as to clamp the peripheral portions of plate 7 (provided with appropriate friction-supporting material) against braking plate 11, said springs being adjusted to overcome the action of spring 8. Inasmuch as plate 7 is keyed or otherwise slidably connected to the central part of planetary gear 6, rotation of the latter is thus prevented and the satellites turn to yield the small speed combination.

If the higher speed (direct drive) combination be desired, handle 14 is actuated so that ring 13 pushes element 9 to the left against the action of springs 10. Spring 8 then will act to couple plate 7 to friction plates 12, this coupling action being facilitated by the relatively great difference of speed between elements 7 and 12 at the moment coupling begins. The driving and driven shafts will then rotate in direct drive. From the foregoing, it will be seen that coupling plate or disc 7 alone assures operation in either one of two speed combinations by a mere axial displacement thereof along central planetary gear 6. Elements 13 and 14 may be replaced by a fork 14ª engaging in a groove 13° formed in a flange 13ª integral with plate 7. If the transmission does not support very heavy loads, friction discs 12 may be replaced by a single friction disc concentric to shaft 5 and positioned to contact with coupling plate 7 when the latter is displaced by spring 8.

This form of transmission, as well as those hereinafter to be described, may be lubricated by providing a longitudinal passage 1° through driving shaft 1, said passage communicating at one extremity with the lubricating system of the motor and, at the other extremity, with a hollow chamber 5ª in driven shaft 5. A plurality of radial passages 5° carry oil, under the action of centrifugal force, to the operating elements external to shaft 5, while a pair of annular, sloping plates 2ª and 4ª act to guide lubricating oil to passages inside the shafts supporting satellites 3. The oil returns to the motor via a plurality of grooves or gutters formed on the internal surfaces of the various rotating elements.

In the second form of the invention shown in Figure 2, the planetary system is of a different type and demonstrates that the invention may be applied to planetary systems of whatever design. Here, satellites 3 are mounted to rotate on fixed shafts supported on fly wheel 16. Driven shaft 5 is rigidly connected to one of the planetaries 6ª while the other planetary 6ᵇ is loosely mounted on said shaft and acts to yield (1) a small speed combination when it is stopped and (2) direct drive when it is connected to the motor. Coupling disc 7 is keyed to planetary 6ᵇ and is capable of sliding axially thereon. A clutch disc 9 of annular form replaces discs 12 shown in Figure 1. A braking disc 11 rigidly connected to transmission casing 15 replaces flange 11 in Figure 1. A sort of annular cage including a pair of annular discs 9¹ and 11¹ are mounted concentrically on plate 7 and are maintained in spaced relation by a plurality of cross bars 18 guided in orifices distributed around the outer portion of plate 7. The distance between 9¹ and 11¹ is chosen so that plate 11¹ lies out of contact with disc 11 when plate 9¹ is in contact with friction disc 9. A plurality of springs 19 are interposed between elements 7 and 11¹ and have the same function as spring 8 in Figure 1. These springs clamp disc 9 between plates 7 and 9¹ without any lateral reaction being produced.

Control of the various operating elements is effected by means of a combination including a ring 13 capable of being rotated by a handle 14, axial displacement being prevented by a slot 17 engaging with a proper pin. Ring 13 is provided with a pair of recessed portions 20 having the function of cam surfaces and capable of receiving a pair of rollers 21 mounted on a pair of annular rings 22 and 23 positioned on opposite sides of ring 13. A plurality of springs 24 tend to maintain rollers 21 in contact with the lateral portions of ring 13 against the opposing action of springs 19. When ring 13 is rotated so that rollers 21 enter grooves 20, rings 22 and 23 move toward one another. A fork 14ª similar to the one shown in Figure 1 (shown in dotted lines) may be utilized to displace annular ring 13.

Assuming that the various operating elements are in the position shown in Figure 2 and that ring 13 be rotated to bring rollers 21 into grooves 20, rings 22 and 23 will move toward one another so that the former ring contacts with plate 7 while the latter ring contacts with plate 11¹. Elements 7 and 11¹ will therefore move toward one another so as to liberate disc 9 from the gripping action of elements 7 and 9¹ so that brake disc 11 is clamped between plates 7 and 11¹. The planetary system will then operate to yield the small speed combination. If ring 13 be then moved in the opposite direction an inverse series of operations will take place, and the driving and driven shafts will be coupled directly through the intermediary of elements 7, 9 and 9¹ which will be brought into clamping relation with one another.

Figures 3 shows how each speed combination may be introduced progressively in accordance with the load on the motor. Ring 13 is provided, here, with a finger or arm 25 capable of occupying either one of three positions s¹, s⁰ and s² corresponding to operation with the small speed combinations, in neutral, and direct drive respectively. During its displacement from s⁰ to s¹ or from s⁰ to s² arm 25 pushes on a rod 27¹ or 27² connected to dash pots 28¹ and 28² provided with pistons acting to compress the air in the dashpot cylinder, the latter being provided with discharge orifices 29¹ and 29². If these latter orifices are open, the pistons encounter no appreciable resistance. A pair of needle valves 30¹ and 30² are mounted at the end of a pair of levers 31¹ and 31², the latter being controlled by a pair of flexible diaphragms 32¹ and 32² responsive to variations in suction in the motor's intake manifold communicated via a conduit 33, and act to obstruct orifices 29¹ and 29² in accordance with variations in the load on the motor thereby varying the resistance to movement of the pistons in their dash pots. It will at once be obvious, that when the load on the motor varies, the rate at which ring 13 may be displaced to either one of its extreme positions will vary, the resistances encountered acting to insure progressive action.

A similar result may be obtained by connecting levers 31¹ and 31² by means of an appropriate lever and link system to the accelerator pedal.

Springs 8 and 10, in Figure 1, and 19 and 24, in Figure 2, may be replaced by a single set of springs having the same function in the manner shown in Figures 4 and 5. Plates 9¹ and 11¹ are, here, formed integrally with an annular plate 34 having a plurality of radial orifices 35 formed therethrough. A plurality of shafts 36 are mounted on the periphery of plate 7 and carry pairs of rollers 37 and 38. Exterior rollers 38 intervene to manoeuvre plate 7 by engaging inside a recess 26 formed in a small collar 39, the latter being capable of being displaced axially by ring 13 while prevented from rotation. Ring 13 is here shown guided by a pin 13ˣ moving in a helicoidal groove 14ˣ. Rollers 37 are positioned in line with a pin 41 having a bevelled portion 40 and supported in a casing 43 mounted on plate 34, a spring 42 tending to move pin 41 toward rollers 37.

In the position shown in Figure 4, springs 42 are without any action when lever 14 is manipulated to bring plate 7 to its intermediary position. If, however, the latter plate be displaced ever so slightly to the right or to the left, bevelled portions 40 of pin 41 will react on rollers 37 to force plates 7 more rapidly into contact with the either disc 9 or disc 11. When movement takes place toward the left (Figure 4), disc 9 is clamped between plates 7 and 9¹ to yield direct drive. Movement in the opposite direction will result in operation at the small speed combinations.

In the form of assembly shown in Figure 6, there is shown a transmission provided with a planetary system of the type shown in Figure 2, a single set of springs 42 similar to those represented in Figures 4 and 5, and a positive control of the various operating elements having a coupling action. The springs are positioned radially to facilitate adjustment and are supported on a movable plate 9¹. Points 40 are fitted with rollers which contact with a double conical surface 37¹ formed on the periphery of a disc 6¹ which is keyed to the sleeve supporting central pinion 6ᵇ. In order to properly guide elements 9¹, 7 and 11¹, one of the latter,—in this particular case, plate 9¹,—is mounted to slide axially along a plurality of grooves and teeth formed on disc 6¹. Cross pieces 18 serve to positively connect discs 9¹ and 11¹. A plurality of levers 13ᵇ pivotally supported on disc 6¹ are connected at opposite extremities by means of links 13ᶜ and 13ᵈ to exterior plate 11¹ and central coupling disc 7. It will at once be seen that when a control such as 13ᵃ—14ᵃ (see Fig. 1) is actuated to move element 11¹ toward fixed plate 11, coupling disc 7 will move so that braking plate 11 will be clamped between said coupling disc and plate 11¹ thus yielding a small speed combination, plate 9¹, at the same time, moving away from disc 9.

When plate 11¹ is moved away from disc 11, plate 7 will also move away from the latter and, when the coupling plate occupies its mean position shown in Figure 6, springs 42 are no longer in action and the transmission operates in neutral. Further movement of plate 11¹ to the left will result in plate 9 being clamped between elements 7 and 9¹, and the transmission will operate as a direct drive.

Inasmuch as plates 9 and 11 are supported peripherally, plate 11¹ and the elements coupled thereto may be operated by a central fork 14ᵃ such as is shown in Figure 1. It is to be noted that instead of connecting fork 14ᵃ to disc 11¹, it could equally well be connected to either plates 7 or 9¹, a displacement of any one of these plates being accompanied by a displacement of each of the others.

In the various forms of the invention thus far described, the frictional coupling surfaces have been represented as being plane. In the modifications shown in Figures 7 and 8, these surfaces are given a conical form and are designed so that all lateral reactions are eliminated. The particular variant represented in Figure 7 shows plates 9 and 11 connected to the fly wheel and to the transmission casing respectively and terminating peripherally in a pair of oppositely sloping conical surfaces adapted to coact with correspondingly sloping conical surfaces formed on the inner side of a double flange at the periphery of coupling plate 7. Cage 34 (type Fig. 4) is also provided with conical gripping surfaces 9¹ and 11¹ adapted to coact with the peripheral portions of plates 9 and 11. Lateral displacement of cage 34 and coupling disc 7 produces one or the other of two possible speed combinations in the same manner as for the assembly illustrated in Figure 4.

In Figure 8, the various frictionally contacting surfaces are given the form of biconical rings having a trapezoidal section. Operation is the same as for flat discs but the frictional effort is amplified when using springs of the same strength or tension.

Figures 9 and 10 show how the frictional coupling action may be amplified by means of helical springs whose torsion tends to have a winding or unwinding effect. The periphery of coupling disc 7 is provided with a recess 7o supporting a crown 7x mounted to rotate with plate 7 while being capable of angular displacement when acted on by a lever 7m pivotally mounted on plate 7 at 7n, a cone 13aa, provided with a recess 13o capable of receiving a fork 14a (see Figure 1), acting on a roller supported on the end of lever 7m (against the action of an appropriate spring) to angularly displace crown 7x. A plurality of helical springs 7a and 7b connected at opposite extremities to crown 7x and to the lateral walls of recess 7o serve as friction coupling elements. When crown 7x occupies its mean position springs 7a and 7b lie out of contact both with the bottom of recess 7o and plates 9 and 11. Displacement of cone 13aa in the direction of the arrow shown in Figure 9 will result in a displacement of crown 7x in the direction of the arrow shown in Figure 10. Spring 7a will then unwind so as to contact with element 11, thus exerting a braking action on coupling plate 7 and bringing the latter to rest. The transmission will then operate in the small speed combinations in the manner, and for the reasons, already set forth. During the unwinding of spring 7a, spring 7b winds up and decreases in diameter, thus insuring against any coupling action on its part. Displacement of cone 13aa in the opposite direction will, contrariwise, cause spring 7b to increase in diameter until contact is made with element 9, thus yielding direct drive.

In the various forms of the invention so far described, the transmissions shown are more particularly adapted to be coupled directly to the motor. If it be desired to combine these transmissions with other gear boxes so as to receive a motor couple which is already amplified, they must be specially designed to insure proper coupling action. Figures 11 and 12 show assemblies in which the relative speeds of the elements to be coupled are utilized to automatically increase the force with which the latter are held in contact with one another.

In the particular form of the invention shown in Figure 11, the amplifying effect is obtained by means of spring couplings similar to those in Figures 9 and 10. Crown 7x is, here, directly actuated by fork 14a, this crown being mounted to turn freely relatively to coupling plate 7 while, at the same time, being axially displaceable with relation to the latter. In order that this be possible, a proper opening is formed in the periphery of coupling element 7 permitting displacement of the crown in question. Springs 7a and 7b act as before to produce coupling but also tend to return crown 7x to a neutral position due to their elasticity. When fork 14a is actuated to move crown 7x toward braking element 11, spring 7a is compressed until the conical peripheral portion of crown 7x contacts with fixed element 11. This contact (which may be further aided by the action of springs 42 such as are shown in Figure 5), is sufficient to unroll spring 7a, the latter being connected indirectly to element 7 which is still in rotation. The unrolling of this spring produces an energetic coupling with fixed element 11 and the angular movement of crown 7x winds up spring 7b at the same time. As will be obvious from an inspection of the drawings, movement of crown 7x in the opposite direction will couple moveable element 9 to coupling disc 7 while, at the same time, insuring winding up of spring 7a.

In Figure 12, coupling plate 7 is mounted between plates 9 and 11 and is provided internally with a thread meshing with a threaded cylinder capable of sliding axially along the hub of central planetary 6b, said cylinder being rigidly connected to, or integral with, lateral plates 9¹ and 11¹. In the position shown in Figure 12, the various operating elements have been displaced so that plate 9, connected to the fly wheel of the motor, is clamped between coupling plate 7 and lateral plate 9¹ forming part of cylinder 44. Let it be supposed, that by appropriate means, plate 7 could be arrested and that the direction of the threads on cylinder 44 is appropriately chosen. The rotation of cylinder 44 and stoppage of plate 7 will cause the latter to move away from plate 9 toward plate 11¹ until finally elements 7 and 11¹ are in clamping relation to fixed plate 11. Cylinder 44 will then stop rotating and planetary 6b therewith. The transmission will then operate in the small speed combination and the clamping action will have a very considerable magnitude. In order to arrest coupling plate 7, recourse is had to a second plate 7¹ mounted to rotate concentrically with the latter while being capable of axial movement thereon. Plate 7¹ is controlled in exactly the same manner as plate 7 shown in Figure 2 by means of an annular ring 13 and its operating handle 14, rings 22 and 23 being coupled respectively to an extension 47 mounted on the periphery of plate 7¹ and extension 48 integral with a cylindrical cage 49 appropriately guided inside the transmission casing so as to follow the movements of said rings. Springs are interposed between extensions 47 and 48 and the cylindrical cage supports a pair of lateral flasks 9² and 11² capable of coacting with plates 9 and 11. Let it be supposed that the transmission is operating in direct drive (position shown in Figure 12), plate 9 being clamped on opposite sides between elements 9, 9¹ and 7, 7¹. If lever 14 be actuated to move rings 22 and 23 together, elements 7¹ and 11 and 11¹ and 11² will move toward one another while flask 9² will move away from moveable plate 9. Inasmuch as plate 11 is fixed in position, plate 7¹ will come to rest and simultaneously stop rotation of coupling plate 7. The relative speed of elements 7 and 44 will first uncouple plate 9, plate 7 will then move axially with relation to both cylinder 44 and plate 7¹ and finally, plate 11 will contact with plate 7 and arrest the latter.

When this transmission is operating in a small speed combination, plate 7 and 7¹ as well as elements 44 and 47 are arrested. Movement of lever 14 so as to move rings 22 and 23 apart will cause springs 19 to move plate 7¹ away from braking plate 11. Plate 7¹, as a consequence of the clamping of plate 9 between it and flask 9² will then cause clamping plate 7 to rotate and, inasmuch as cylinder 44 is still at rest, the latter plate will move axially therealong until plate 9 is clamped between it and element 9¹, element 11¹, at the same time, moving away from plate 11. Operation in direct drive will be thus reestablished.

If it be desired to modify this transmission so as to obtain more than two speed combinations, braking plate 11 should be mounted so that, while prevented from moving axially along driven shaft 5, it may be coupled to, or uncoupled from, the latter. To this end, a sleeve 45 is mounted on shaft 5 and is prevented from rotating by an appropriate arm bearing against a stop 45¹. Sleeve 45 may move axially along shaft 5 by means of an appropriate hand control (not shown) reacting on a fork 46 engaging with said sleeve, the latter being provided with appropriate bosses 50ª capable of engaging with a similar series of bosses 50ᵇ integral with the hub of a plate 50 supporting braking plate 11. It will at once be obvious that, when elements 50ª and 50ᵇ are in engagement with one another, stop 45¹ will act to arrest rotation of plate 11 and the apparatus will operate as a two speed combination transmission. If, contrariwise, fork 46 be actuated to uncouple sleeve 45 from plate 50, plate 11 may turn freely and shaft 5 may be coupled with operating elements (not shown) capable of reversing its direction of rotation, for example.

The hereinabove described mechanism may be utilized in combination with ordinary speed changing assemblies, wherein the gears are not axially moveable, if it be desired to render the action of the latter progressive. The structures represented in Figures 12ª and 13 show how this may be done by utilizing a plurality of clutch plates (9) instead of the the combination of a clutch and a braking (11) plate.

Figure 12ª shows two speed combinations obtained by means of gears 5¹—58¹ and 5²—58² which are maintained permanently in mesh with one another in the manner shown, each speed combination being provided with a separate friction or clutch disc, operation in neutral being obtained when both of the friction discs are free. Operation in the low speed combination is obtained through the intermediary of pinion 5¹ keyed to driving shaft 1 and auxiliary pinions 58¹ and 58² mounted on an intermediate shaft 58³, by coupling pinion 5² to driven shaft 5 by means of the clamping action of plates 7 and 11¹ on friction disc 11, plate 11¹ being keyed to driven shaft 5.

When plate 9, driven by motor shaft 1, is clamped between coupling plate 7 and plate 9¹ keyed to shaft 5, operation in direct drive is obtained. When plate 7 occupies its intermediate position, shafts 1 and 5 are no longer in driving and driven relation.

To obtain a displacement of plate 7 in one direction or the other, some such system as is shown in Figure 12 may be employed. However, either one of the systems shown in Figures 2 or 6 may be utilized when modified to give the same result.

In the variant represented in Figure 13, a similar result to the one shown in Fig. 12ª is obtained by utilizing the single series of springs 42 shown in Figure 6 for obtaining a coupling action in either one of two directions, a positive control by levers 13ᵇ, 13ᶜ, 13ᵈ (Figure 6) being utilized to actuate the various coupling discs and plates. These latter elements, instead of being positioned between pinions 5¹—58¹ and 5²—58² as in Fig. 12ª, are placed to one side near the motor fly wheel. The general operation remains the same as for Fig. 12ª.

Figures 13ª and 13ᵇ show variants utilizing conical surfaces and helical spring clutches of the type illustrated in Figures 7 and 11. The manner in which these structures operate need not be given in detail but will be obvious from an inspection of the drawings when considered with the description of the preceding figures.

In each of the variants shown in Figures 2 to 13ᵇ elements 9 and 11 are shown as mounted against axial displacement, while elements 9¹, 7 and 11¹ move axially. Inasmuch as the operation of these various systems depends upon the relative displacement of the five elements 9¹, 9, 7, 11 and 11¹, any given element or group of elements may be displaced axially or mounted against axial displacement, provided that the relative movement desired be obtained. For example, elements 9¹ and 11¹ may be mounted against axial displacement, while elements 9, 7 and 11 are axially displaceable. Similarly, coupling disc 7 may be fixed against axial displacement, while elements 9¹, 9, 11 and 11¹ are made axially displaceable, etc; etc.

A series of speed varying combinations will now be described wherein progressive transmissions of the type forming the subject matter of the present invention are coupled with non-progressive gear boxes or speed changing devices now in use, the entire combination having a unique control. Assemblies of this kind, it may be said by way of anticipation, permit changes in speed ratio without any special precaution even where snatch gear transmissions form a part thereof and also permit elimination of the main clutch generally interposed between the driving shaft and the transmission. It suffices that all movements be transmitted through the intermediary of one of the two speed combinations provided by the progressive portion of the transmission even when the snatch gear combinations or similar non-progressively operating elements are being simultaneously utilized. The control mechanism for the various transmissions is further designed so that the progressive portion thereof is uncoupled slightly in advance of operation of the non-progressive portions and comes back into action only after the latter terminates. Thus, progressivity of action is assured at all motor speeds.

For simplicity of exposition, the various progressive and non-progressive transmission assemblies are shown mounted in distinct casings which are coupled to one another in accordance with the particular speed combination desired. Obviously, these distinct casings could be replaced by a single casing enclosing the whole series of transmissions.

One feature of this assembly of transmission is a special control lever which acts to uncouple the progressive transmission during the lever's angular displacement and permits permutations in the non-progressive transmission only while the progressive transmission is uncoupled.

Figure 14 illustrates, diagrammatically, a transmission including two speed changing assemblies, one being of the progressive type and the other non-progressive, the uncoupling of the progressive assembly at the proper time being obtained by modifying the cam profile of a ring 13 similar to the one shown in Figure 2. As in the case of the structure shown in this latter figure, recesses 20 act to permit movement of rings 22 and 23 toward one another so as to yield operation at reduced speed. As will be seen from an inspection of Figure 14, cam bosses 20¹ will act on rollers 21 to move rings 22 and 23 apart so as to yield operation in direct drive. Neutral cam surfaces 20² positioned between recesses 20 and bosses 20¹ act to maintain rings 22 and 23 in a position corresponding to operation in neutral. If surfaces 20² are made sufficiently long, changes of speed ratio in the non-progressive transmission may be effected while rollers 21 move over said surfaces. It will thus be seen that changes in speed ratio in the non-progressive transmission can be made without any more precautions than those employed when the progressive transmission is utilized alone. The transmissions are controlled by a ring $13^1$ provided with a cam slot 54, a guiding slot $17^1$ engaging with a pin acting to prevent longitudinal movement. A sliding sleeve 51 carrying a fork controlling snatch gear 52 of the non-progressive transmission supports a roller 53 slidably guided in cam slot 54. It will at once be evident that rotation of ring $13^1$ will result in an axial displacement of snatch gear 52 and, if cam groove 54 be positioned properly, displacement of the snatch gear may be made to take place during the time interval that rollers 21 ride over surfaces $20^2$, i. e., when the progressive transmission is inactive. In order that all of the operating elements be controlled by a single lever 14 (not shown), rings 13 and $13^1$ are connected to rotate together by means of a bar or bars 55. To further assure simultaneous movement of rings 13 and $13^1$, they may be provided externally with gear teeth 56 meshing with a pair of pinions 57 of equal diameter keyed to a control shaft 59. Shaft 59 will then act to replace lever 14 and its rotation constitutes a unitary control for both transmissions. If the assembly be properly designed, rotation of shaft 59 through a predetermined series of angles will result in successive passages through the various speed combinations which the transmissions are capable of yielding.

The invention is shown applied in Figure 15 to the special case where transmissions of various types are combined in series to yield eight possible combinations. The first transmission of this series A is driven by the motor fly wheel and is of the type shown in Figure 13. The second transmission B is driven by transmission A and is of the type shown in Figures 6 and 7. Finally, the third transmission C is coupled to the second transmission B and is of the non-progressive type. (Fig. 14).

The control for these various transmissions is effected by means of a shaft 59 of the type shown in Figure 14. Inasmuch as eight combinations are possible, shaft 59 should turn through an eight of a revolution to pass from one speed to another. Ring 13 of transmission A is provided with a cam slot which receives the free extremities of lever $14^a$ acting to positively control discs 7, 9 and 11 to yield either one of two speed combinations (Figure 13). Angular rotation of shaft 59 will cause pinion 57 to rotate ring 13 so as to angularly displace levers $14^a$ and permit springs 42 to act so as to couple discs 7, 11 and $11^1$ (small speed) or discs 7, 9 and 91 (direct drive).

Control of transmission B is effected by means of lever $14^a$ engaging in cam grooves formed in the walls of ring 13. Angular displacement of shaft 59 will result in rotation of ring 13 controlling this transmission so as to oscillate levers $14^a$.

Similarly, a lever $51^1$ is guided in the cam groove in a ring $13^1$ to control transmission C. The lubrication of each transmission A, B and C may be of the same type as that shown on Fig. 1 through central passages each as 1° shown more particularly for transmission A.

Control shaft 59 is driven by a pair of bevel gears 60 connected in driven relation to a shaft 61 which supports a control lever 62 free to move on shaft 61 between the limits of a pair of stops $62^1$ and $62^2$. Control lever 62 articulates with a double acting dog 63 connected by means of a rod 64 to a handle 65 slidably mounted on the control lever. Rod 64 receives the opposing thrusts of two springs $66^1$ and $66^2$ tending to move control handle 65 into a mean position $a$. In this latter position, dog 63 is out of contact with a pair of ratchet wheels $67^1$ and $67^2$ having their teeth formed in opposite directions, both ratchets being keyed to shafts 61. When control handle 65 is moved downward into position $c$, nose $63^1$ of dog 63 moves into engagement with ratchet $67^1$. Displacement of control lever 62 to the left (Fig. 15) will then result in rotation of shaft 59 through ⅛ of a turn and rings 13, $13^1$ will act to change the speed combination to the next higher. If, contrariwise, handle 65 be moved upward into position $b$, nose $63^2$ of dog 63 will engage with ratchet $67^2$, and rotation of levers 62 to the right will cause shaft 59 to produce a shift into a lower speed combination.

As shown in Figure 16, recourse may be had, if desired, to a double acting dog 63 controlled by a handle 65 capable of occupying either one of only two positions. In one of these positions, nose $63^2$ is in engagement, control handle occupying its elevated position, while in the other position, wherein the control handle has been moved downward to compress a single spring 66, nose $63^2$ moves out of engagement with ratchet $67^2$ and nose $63^1$ engages with ratchet $67^1$.

Obviously, shaft 59 instead of being controlled by lever 62 could be coupled to a servo-motor acting to automatically change speed ratios in accordance with the conditions of motor or vehicle operation in the manner indicated in the inventor's prior patents and in copending application Serial No. 520,090, filed March 4, 1931.

In actual practice it is found that passages into higher speed combinations are rapidly effected if the carburettor valve be momentarily closed. Similarly passages to lower speed combinations take place more rapidly if the carburettor valve be momentarily opened. This will be readily understood, if it be remembered that in the former case the motor should slow down, while in the latter it should accelerate rapidly. Figure 15 shows how these effects may be obtained automatically. Lever 68, controlling the valve of carburettor 69, is connected as usual to accelerator pedal 70 and is displaced automatically during speed changes. To this end, a lever 71 connecting lever 68 to the accelerator pedal is provided with a pair of opposed springs $72^1$ and $72^2$ permitting the vehicle operator to move the carburettor valve between extreme position $o$ corresponding to full opening and position $f$ corresponding to complete closure. A pair of auxiliary levers 74 and 75 are mounted to freely rotate on shaft 73 supporting lever 68 and tend to be drawn to the left by a pair of springs $74^1$ and $75^1$. A pair of flexible cables $74^2$ and $75^2$ are connected to each of the auxiliary levers so that when cable $74^2$ pulls on lever 74, the latter acts to displace lever 68 into position $o$ against the action of spring $72^2$, cable $75^2$ acting, contrariwise, to move lever 68 toward position $f$. It will be seen, however, that springs $72^1$ and $72^2$ permit free action of the accelerator pedal irrespective of angular displacements of lever 68 resulting from traction on either cables $74^2$ or $75^2$.

The same result could be obtained by mounting an abutment on rod 71 positioned so that, when the accelerator pedal is depressed, lever 68 moves toward position $o$, said lever being moved toward position $f$ by a suitable spring when the accelerator pedal is released. This lever should, in this case, also be provided with a control of the type 74² acting to open the carburettor valve all the way even when the vehicle operator maintains the pedal in an intermediate position. This assembly should be further provided with a second valve capable of closing the intake conduit of the carburettor, the latter valve remaining normally open and being capable of closure by some such control as 75² coming into action during passages into higher speeds while remaining open during descending passages.

Referring again to Figure 15, cable 74² and 75² are shown controlled by a pair of cams 74³ and 75³ mounted on a shaft coupled to shaft 59. Each of these cams is provided with a series of notches 79 (Figure 17) corresponding to each operating position of shaft 59. A roller 76 mounted on a lever 77 pivotally supported at 78 is positioned to engage in the various notches and, with each angular movement of shaft 59, exerts a pull on cable 74², spring 74¹ acting to maintain the roller in position in any given notch when control shaft 59 is at rest. Cam 75³ is designed in a similar manner and acts to control cable 75² in the same way.

In order that cam 74³ act on lever 74 only during passages to lower speeds and cam 75³ acts similarly on lever 75 only during passages to higher speeds, these cams are not directly keyed to shaft 59 but engage laterally with lateral ratchets 74⁵ and 75⁵ mounted to slide along shaft 59 and driven thereby. Another pair of ratchets 74⁶ and 75⁶ are positioned on the opposite side of each cam and are prevented from rotating by a pair of fixed arms 74⁷ and 74⁸. The ratchets on opposite sides of each cam have their teeth directed oppositely and it will at once be seen that irrespective of the direction of rotation of shaft 59, the cams will be able to rotate only in the direction shown by the arrows in Figure 18.

Unidirectional movement of each cam may also be obtained in the manner shown in Figure 20. Here, each of the cams, such as 74³ᵃ, is given a ratchet like form permitting its rotation only in the direction of the arrow. Rotation in the opposite direction is prevented by a roller 80 engaging with the teeth thereof. Each cam is further provided with a dog capable of engaging with a ratchet 81 driven by shaft 59. Obviously, each cam will be in driven relation to shaft 59 only when the latter turns in a predetermined direction and, when shaft 59 turns in the opposite direction, each cam turns freely thereon. By proper choice of the profile of each cam and its coacting ratchet, one or the other will turn when the direction of rotation of shaft 59 is reversed.

Instead of connecting the cams in driven relation to shaft 59 by means of a ratchet 81, this may be effected by means of a friction disc 82 slidably keyed to said shaft and pressed against the cam laterally by means of an appropriate spring as shown in Fig. 19. Roller 80 will thus act to prevent rotation of the cam in one direction in spite of frictional contact with disc 82, while permitting rotation of the cam in the opposite direction under the action of said disc.

In order to prolong the action of the cable 74² and 75² on levers 74 and 75, the latter are fitted with dash pots 74⁴ and 75⁴. It will thus be seen that the movement of levers 74 and 75 into action is not modified, while their return under the action of springs 74¹ and 75¹ may be prolonged as desired by changing the adjustment of the dash pots.

If desired, instead of utilizing the action of cam 74³, 75³, the movement of control handle 65 into any one of its three positions may be taken advantage of for controlling lever 68 of the carburettor or, both controls may be used concurrently. This is effected by connecting rod 64 to a lever 83 pivotally supported on control lever 62, lever 83 being connected by cables 74ᵃ and 75ᵃ similar to 74² and 75² to levers 74 and 75 respectively. When handles 65 occupies mean position a, lever 83 is perpendicular to lever 62 and neither of the cables connected thereto are in action. As soon as the control handle is lowered into position o (position corresponding to increasing speeds), lever 83 tilts so as to exert traction on cable 74ᵃ and closes the carburettor valve. Movement of the control handle into position b will result, similarly, in an opening of the carburettor valve during passage to a lower speed combination.

If any one of the transmissions utilized be of the electromagnetic type changes in speed combination will be effected by excitation of a proper coil. The control of such a transmisison will include a distributor capable of occupying any one of three positions (where the transmission is designed to yield two speed combinations), one of these positions corresponding to operation in neutral. If it be desired to control a transmission of this type by means of a single lever, the distributor should be mounted on the control lever of the type shown in Figure 15, the latter being modified as shown in Figure 16ᵃ. In order to permit the vehicle operator to control the carburettor in the manner hereinabove described, control handle 65 in Figure 15 is replaced by a balance lever 87 whose extremities are connected to carburettor control cables 74ᵃ and 75ᵃ (Figure 15). If the vehicle operator wishes to pass to a higher speed combination, he pushes on a nob 74ᵇ mounted on one end of lever 87 so as to exert traction on cable 74ᵃ acting to close the carburettor valve. If he wishes to pass to a lower speed combination, he presses on a nob 75ᵇ positioned on the other end of lever 87 so as to exert traction on the other carburettor control cable. It will thus be seen that lever 87 acts to replace the combination of elements 64, 65 and 83.

Nobs 75ᵇ and 74ᵇ should be connected to rotate together by a link 89 and control of the electric circuits constituting part of the electromagnetic transmission. Rotation of either nob into any one of the three operating positions will result in the transmission's operation in neutral or in one or the other of two speed combinations.

From the foregoing it will be seen that, irrespective of whether a progressive or non progressive type of transmission be momentarily utilized, a progressive effect is obtained by angular displacement of control lever 62 without the necessity of manipulating a clutch or the accelerator pedal. However, in spite of the progressivity obtained during passage from one speed ratio to another without special operating precautions, in the special case where the vehicle is at rest and it is desired to start movement, operating handle 62 must be manipulated slowly and carefully. In actual practice it is found that vehicle operators, being in the habit of rapidly moving the gear shift levers now in general use, have considerable difficulty in habituating themselves to a slow movement of handle 62 during starting. Means have therefore been provided for taking care of this psychological limitation, but it will be understood that this means is not indispensable.

Lever 62 is manipulated only after the vehicle is in motion and changes in speed ratio are desired, and an auxiliary pedal 83 (Figures 15 and 21 to 25) is mounted beside the accelerator pedal to be used especially for starting. The function of pedal 83 is to move the element controlling the progressive transmission (ring 13, for example in Figure 14) toward its mean position so as to diminish or even eliminate, momentarily, the coupling action and render the latter more progressive.

In the assembly shown in Figure 21, ring 13 and control lever 62 are shown in their mean positions. Movement of the control lever is communicated to ring 13 through the intermediary of a piston 84 positioned between a pair of opposed springs. Extension 14, controlling ring 13, is provided with a pin 85 positioned to move between jaws 86 and 86ª forming the constituent parts of a Nuremburg scissors, said jaws tending to be maintained in open position by a spring 87 and closing under the action of pedal 83 provided with a return spring 88. When the scissors is open, the distance between the jaws is sufficient to permit lever 62 to displace ring 13 into position I corresponding to direct drive or position II corresponding to operation at reduced speed. Assuming the vehicle to be at rest, if the vehicle operator wishes to uncouple the transmission, he pushes on pedal 83. Irrespective of whether finger 85 be in position I or II, pressure on pedal 83 will move the jaws of the scissors together so as to move the finger into neutral position III. Control lever 62 may, nevertheless, remain in its original position due to compression of either one of the two springs reacting on piston 84. When the vehicle operator wishes to effect a coupling action in the transmission, it suffices that he slowly release pedal 83 in the manner usually employed for a clutch pedal, finger 85 then slowly moving, under the action of the springs coacting with piston 84, into position I or II in accordance with the position of control lever 62. The corresponding speed combination will thus come into play progressively.

In the variant represented in Figure 22, finger 85 is mounted directly on ring 13 and may be displaced into positions I, II or III when pedal 83 is released. Pressure on the latter, contrariwise, will move said finger and ring 13 to neutral position III due to the action of a vertically guided cam 89 having an appropriate symmetrical profile. The full line position corresponds to operation at one speed combination, while the dotted line position corresponds to operation in neutral.

Figures 23 and 24 show two operating positions of another possible variant yielding the same results. Instead of positioning cam or cams 20 (Figure 14) on opposite sides of ring 13, the following assembly is utilized, said ring is formed in two telescoping parts 13ᵐ and 13ⁿ connected by a pin 90 sliding in a groove 91 so that both rings, while capable of sliding over one another, rotate together under the action of control pinion 57 (Figure 14). Sliding movement of the two rings is effected by means of a lever 93 pivotally connected at 92 to pedal 83, the extremities of said lever carrying appropriate rollers engaging in a pair of grooves 13° and 13°° formed in rings 13ᵐ and 13ⁿ. It will be seen that, when pedal 83 is released, the profiles of each cam element (Figure 23) extend beyond the lateral edges of the other, while, contrariwise, when the pedal is depressed (Figure 24) the cam profiles are hidden due to the telescoping movement of the two rings. The amplitude of the telescoping movement corresponds to the movement of cams 20¹ and 20² necessary to hide their respective cam surfaces. When the pedal moves back to its original position, the telescoping rings move back into the position that they had occupied before being manoeuvred by control shaft 59, thus bringing the particular speed combination previously utilized back into play.

Figure 25 shows another variant in which ring 13 together with its control cam 20 and control gear 56 are divided between two independent annular elements 13 and 56¹ connected operatively by a pinion 95 meshing simultaneously with a pair of circular racks 96¹ and 96² formed on said annular elements. A link 97 articulates with pinion 95 at one extremity and with pedal 83 at the other. When pedal 83 is depressed and control pinion 57 acts on gear 56 to rotate ring 56¹, ring 13 moves angularly in the opposite direction and to the same extent. When the pedal is pushed into contact with a stop 94, ring 56¹ is arrested by pinion 57, while ring 13 rotates so that roller 21 (Figure 14), formerly in contact with cam surface 20¹, for example, moves into contact with cam surface 20², thus bringing the transmission into neutral position. When the pedal is released, pinion 95 and ring 13 return to their respective initial positions.

In actual practice it is found that, during a change in speed ratio, the vehicle may move violently forward if the motor is developing relatively small amount of power. The force exerted on the coupling discs is adjusted to permit the total power being momentarily developed by the motor to be transmitted and, during a change, in speed ratio, this force may produce too rapid acceleration of the vehicle. It is, therefore, desirable to provide a corrector of the coupling force acting to graduate the latter in accordance with the power being delivered by the motor. To this end, as shown in Figures 15, 21 and 23, a link 100 is connected at opposite extremities to pedal 83 controlling the transmission and to a diaphragm 101 positioned in a chamber 102 communicating with the intake manifold of the motor through a conduit 103. Diaphragm 101 will act on pedal 83 to oppose the action of the springs having a coupling action, the magnitude of the resistance thus developed being at a maximum when the suction in the intake manifold is greatest i. e., when the motor is developing only a small amount of power. Elements 101, 102 and 103 and their coacting mechanisms should be designed so that the force exerted by the springs having a coupling action be capable of reduction to only a fraction of its normal value. When the motor is developing maximum power, the depression will be at a minimum and the springs in question will be free to exert their maximum effect. It is to be noted that this suction operated device does not act to change the speed ratios being utilized, but function merely to modify the force of the coupling action in accordance with the momentary power development of the motor.

The invention is not to be taken as limited to the combinations shown in any particular figure: thus, the particular progressive transmission shown in Figure 15 may be replaced by any of the others shown in the figures preceding the latter; the device shown in Figure 3 may be coupled to any one of the transmissions shown in the other figures wherein a ring equivalent to element 13 is utilized; the plane type of coupling surface shown in Figures 1, 2 and 4 may be used interchangeably with those shown in Figures 7 and 8 and 9 to 11; the non-progressive form of transmissions shown in Figures 12ª and 13 may be fitted with any of the equivalent coupling disc and plate assembly shown in the other figures; etc.

What I claim is:—

1. In combination with a motor provided with a driving shaft, a carburettor including a valve controlling said motor, a driven shaft, a transmission interposed between said driving and driven shaft and operative to vary the speed ratio thereof, and a control element connected to said transmission,—means separate from and independent of said driving and driven shafts connected to said control element and operative by movement of the control element to move said valve toward closed position when speed changes are being effected in said transmission on the increasing side, said last named means also operating to move said valve toward its open position when said control element is displaced to effect speed changes on the decreasing side.

2. In combination with a transmission including a driving shaft, a driven shaft, and means for coupling said shafts in any one of a plurality of speed ratios,—means for controlling said last named means including a control shaft, a control lever mounted to be angularly displaced, a double acting dog pivotally supported on said control lever, a pair of ratchets mounted to engage with said dog, said ratchets having their teeth oppositely directed, means for transmitting the movements of said ratchets to said control shaft, means connected to said control lever and operative to move said dog into contact alternatively with either one of said ratchets, a pair of cams mounted in driven relation to said control shaft, means operative to connect only one of said cams in driven relation to said control shaft when the latter turns in a predetermined direction, a motor operating to rotate said driving shaft, and means operative by said cam to modify the speed of said motor.

3. In combination with a transmission including a driving shaft, a driven shaft, and means for coupling said shafts in any one of a plurality of speed ratios,—means for controlling said last named means including a control shaft, a control lever mounted to be angularly displaced, a double acting dog pivotally supported on said control lever, a pair of ratchets mounted to engage with said dog, said ratchets having their teeth oppositely directed, means for transmitting the movements of said ratchets to said control shaft, means connected to said control lever and operative to move said dog into contact alternatively with either one of said ratchets, a lever pivotally mounted on said control lever, a motor actuating said driving shaft, means operative by said last named means and reacting on said last named lever, and means connected to said last named lever for modifying the speed of said motor.

4. In combination with a transmission including a driving shaft, a driven shaft, and means for coupling said shafts in any one of a plurality of speed ratios,—means for controlling said last named means including a control shaft, a pair of cams mounted in driven relation to said control shaft, means operative to connect only one of said cams in driven relation to said control shaft when the latter turns in a predetermined direction, a motor operating to rotate said driving shaft and means operative by said cam to modify the speed of said motor.

5. In combination with a transmission including a driving shaft, a driven shaft and means for coupling said shafts in any one of a plurality of speed ratios,—means for controlling said last named means including a control shaft, a control lever mounted to be angularly displaced, a double acting dog pivotally supported on said control lever, means operative to engage with said log, means for transmitting the movement of said last named means to said control shaft, means connected to said control lever and operative to move said dog, a lever pivotally mounted on said control lever, a motor actuating said driving shaft, means operative by said last named means and reacting on said last named lever and means connected to said last named lever for modifying the speed of the motor.

6. In combination with a motor provided with a driving shaft, a carburettor including a valve controlling said motor, a driven shaft, a transmission interposed between said driving and driven shafts and operative to vary the speed ratios thereof, said transmission including speed changing elements of the non-progressive type, and a control element connected to said transmission,—means connected to said control element and reacting on the non-progressive elements or the transmission, said last named means being operative to move said valve toward closed position when speed changes are being effected in said transmission on the increasing side, said last named means being operative to move said valve toward its open position when said control element is displaced to effect speed changes on the decreasing side.

7. In combination with a motor provided with a driving shaft, a carburettor including a valve controlling said motor, a driven shaft, a transmission interposed between said driving and driven shafts and operative to vary the speed ratios thereof, and a control element connected to said transmission,—means including a shaft mounted to be angularly displaced by said control element and operative by movement of the control element to move said valve toward closed position when speed changes are being effected on the increasing side, said last named means also operative to move said valve toward its open position when said control element is displaced to effect speed changes on the decreasing side.

GASTON FLEISCHEL.